April 17, 1956 E. B. MILLER 2,742,346
RECOVERY OF ELEMENTAL SULPHUR FROM GASES CONTAINING H₂S
Filed March 2, 1953 9 Sheets-Sheet 1

FIG. I.

INVENTOR
ERNEST B. MILLER

BY *Adams & Bush*

ATTORNEYS

April 17, 1956     E. B. MILLER     2,742,346
RECOVERY OF ELEMENTAL SULPHUR FROM GASES CONTAINING $H_2S$
Filed March 2, 1953     9 Sheets-Sheet 2

INVENTOR
ERNEST B. MILLER
BY    *Adams + Bush*
ATTORNEYS

INVENTOR
ERNEST B. MILLER

BY Adams + Bush

ATTORNEYS

April 17, 1956  E. B. MILLER  2,742,346
RECOVERY OF ELEMENTAL SULPHUR FROM GASES CONTAINING H₂S
Filed March 2, 1953  9 Sheets-Sheet 5
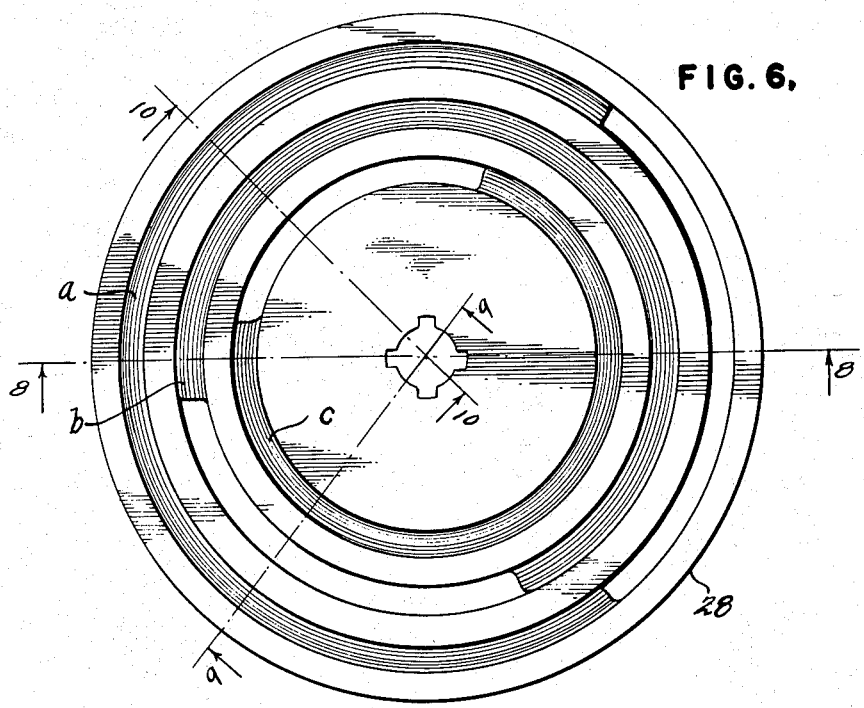
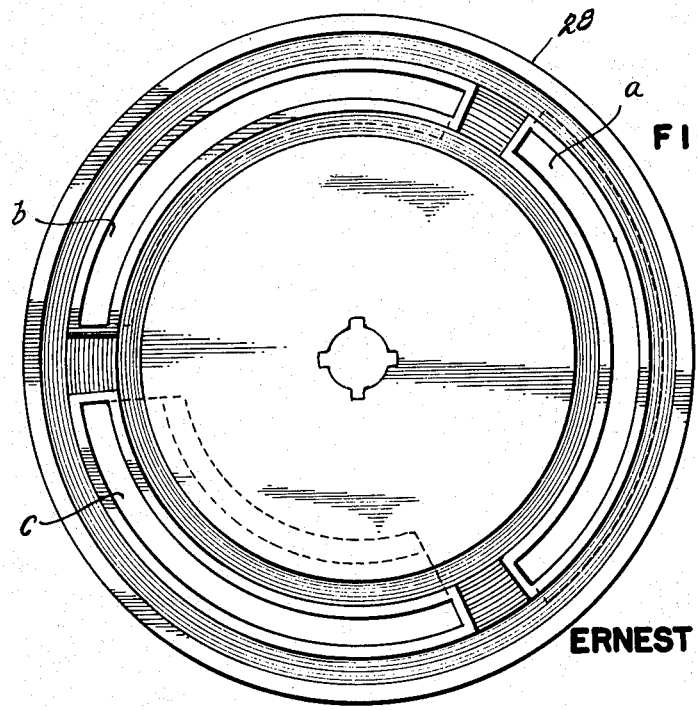
INVENTOR
ERNEST B. MILLER
BY *Adams + Bush*
ATTORNEYS April 17, 1956  E. B. MILLER  2,742,346
RECOVERY OF ELEMENTAL SULPHUR FROM GASES CONTAINING H₂S
Filed March 2, 1953  9 Sheets-Sheet 6

INVENTOR
ERNEST B. MILLER
BY
ATTORNEYS

INVENTOR
ERNEST B. MILLER

BY *Adams + Bush*

ATTORNEYS

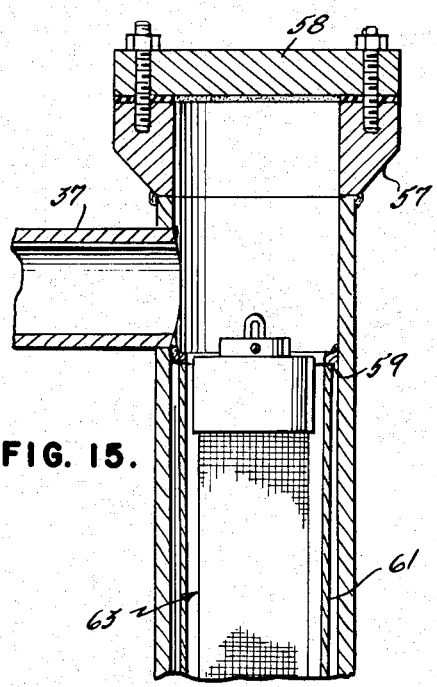
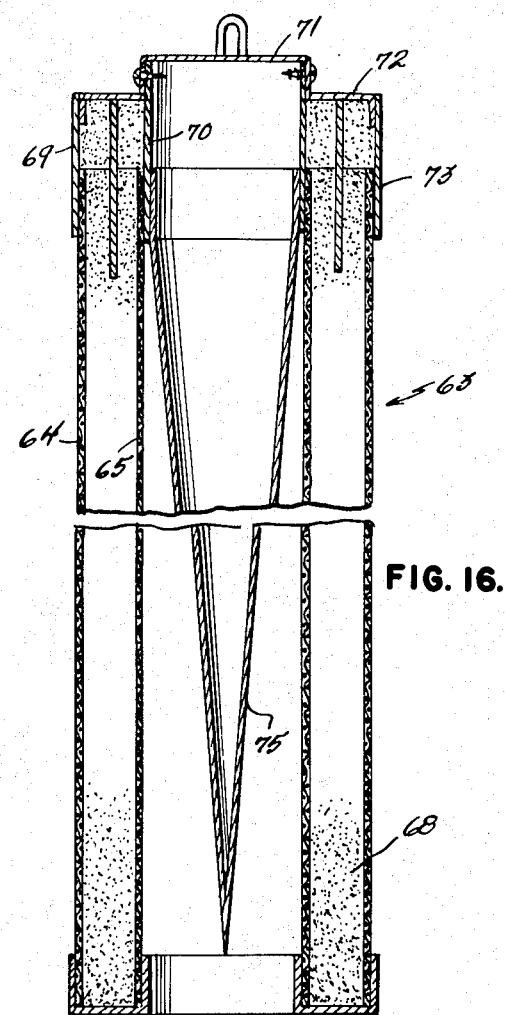
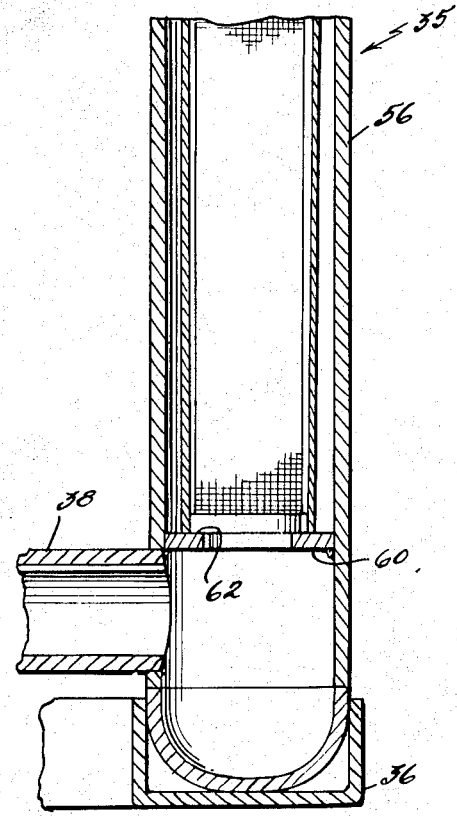
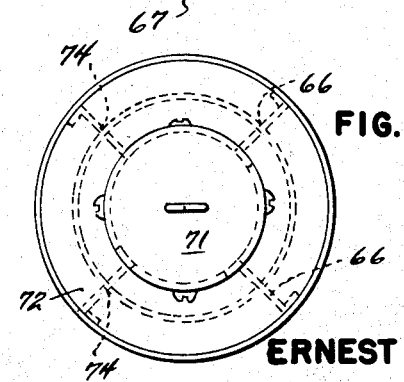

United States Patent Office 2,742,346
Patented Apr. 17, 1956

2,742,346

RECOVERY OF ELEMENTAL SULPHUR FROM GASES CONTAINING $H_2S$

Ernest B. Miller, Houston, Tex., assignor to Jefferson Lake Sulphur Company, New Orleans, La., a corporation of New Jersey Application March 2, 1953, Serial No. 339,805

9 Claims. (Cl. 23—225)

This invention relates to the recovery of sulphur from gases containing sulphur compounds and has more particular reference to a novel method of recovering elemental sulphur in liquid form from gases containing hydrogen sulphide.

The object of the present invention is to provide a novel method of recovering elemental sulphur from gas containing hydrogen sulphide by catalytically desulphurizing the gas to obtain liquid sulphur.

Another object of the invention is to provide a novel method of recovering elemental sulphur from gases containing $H_2S$ in which a catalyst is used which is able to effect a highly efficient conversion of $H_2S$ to $H_2O$ and sulphur and in which the catalyst, after it has become spent, due to chemical reduction of the catalytic agent or the deposition of carbon or other contaminants from the gas being treated, may be fully restored to its initial efficiency by reactivation with hot air.

Another object of the invention is to provide a novel method of recovering elemental sulphur from gases containing $H_2S$, as characterized above, which is characterized by maintaining at least one bed of catalyst in each of a plurality of zones forming a first group of zones and in each of a plurality of zones forming a second group of zones; mixing a predetermined amount of the gas to be treated with a predetermined proportion of sulphur-liberating gas and continuously directing a flow of the gaseous mixture at an optimum pre-reaction temperature through all of the zones forming the first group of zones, so that reaction will take place therein and the $H_2S$ contained in the gaseous mixture will be converted into sulphur vapor and steam; continuously directing the flow of a hot oxidizing medium through all of the zones forming the second group of zones to reactivate the catalyst therein; shifting the flow of the gaseous mixture and the flow of the oxidizing medium through said groups of zones by a simultaneous rotary movement so that the trailing zone, in the direction of rotation, in each group of zones will be transferred to the other group of zones whereby each zone will become in succession a reaction zone and a reactivation zone, continuously withdrawing the reacted gaseous mixture from the zones in which reaction is taking place and directing its flow through a condensing zone; and there condensing the sulphur vapor to form liquid sulphur.

Another object of the invention is to provide a novel method of recovering elemental sulphur from gases containing $H_2S$, as characterized above, wherein a portion of the liquid sulphur being recovered is returned to a sulphur burner, where it is burned to supply the oxidant required to oxidize the $H_2S$ in the gas being processed.

A further object of the invention is to provide a novel method of recovering elemental sulphur from gases containing $H_2S$, as characterized above, wherein the temperature rise in each reaction zone is controlled by controlling the supply of oxidation gas to such zones.

Other objects and advantages of the invention will appear in the specification when considered in connection with the accompanying drawings, wherein:

Fig. 6 is a plan view of one surface of a rotatable disc valve, with the packing rings omitted;

Fig. 7 is a plan view of the other surface of the rotatable disc valve shown in Fig. 6, with the packing rings and seal packing omitted;

Fig. 15 is a vertical sectional view of one of the pressure vessels having a fluid treating material container mounted therein;

Fig. 16 is a vertical sectional view with parts broken away, of the fluid treating material container shown in Fig. 15;

Fig. 17 is a plan view of the container shown in Fig. 16; and

In general, the invention comprises a method of catalytic desulphurization of gases containing hydrogen sulphide, and the recovery of elemental sulphur therefrom in liquid form. It is related to the method disclosed in my co-pending application Ser. No. 215,181, filed March 12, 1951, which has issued as Patent No. 2,630,375, March 3, 1953, for Method of Catalytic Desulphurization of Gases, in that the reaction of the gas may be carried out in two or more stages, while one stage is employed for reactivation.

For the purpose of illustration, the invention will be described in connection with the catalytic desulphurization of sour natural gas and the recovery of elemental sulphur therefrom in liquid form.

Figure 18:
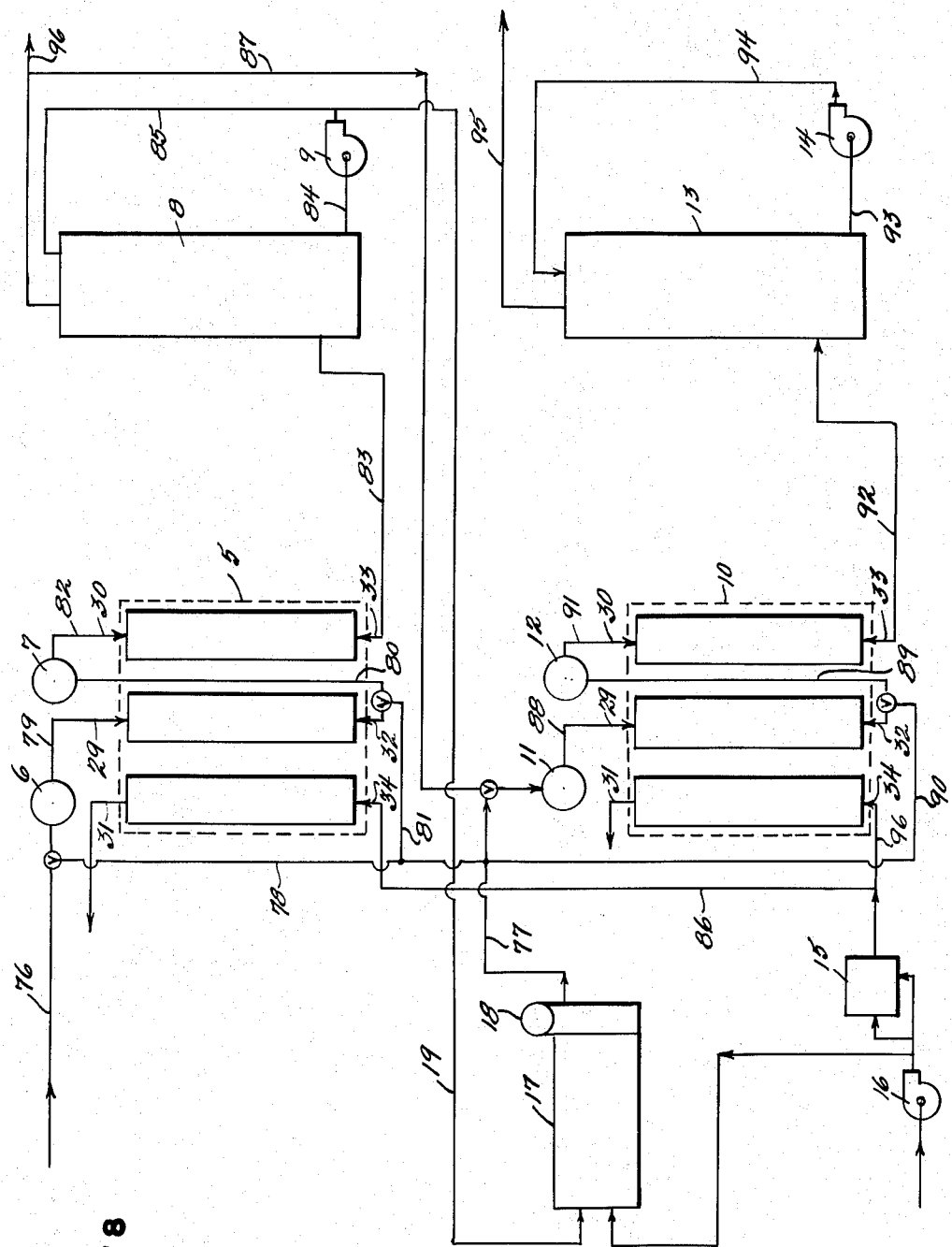
Fig. 18 is a schematic view showing the arrangement of the apparatus employed in carrying out the method of the present invention and the flow of the various fluids therethrough.

Referring now to the drawings, there is shown in Fig. 18, one embodiment of the apparatus and the arrangement thereof for carrying out the method of this invention. The apparatus shown includes a first three-stage catalytic converter or reactor 5, two stages of which are used as reaction stages, in which the sour gas is brought into intimate contact with the catalyst, and the other stage is used as an activation stage, in which the catalyst is regenerated; a first pre-heater 6 for heating the sour gas prior to its passage through the first reaction stage of the converter 5; a heat exchanger 7 for heating or cooling the sour gas between the first and second reaction stages of the converter 5; a first scrubbing tower 8 for separating the liquid sulphur from the treated gas; a pump 9 for pumping liquid sulphur to the top of the first scrubbing tower; a second three-stage catalytic converter 10, two stages of which are used as reaction stages in which the sour gas is brought into intimate contact with the catalyst and the other stage is used as an activation stage in which the catalyst is regenerated; a second pre-heater 11 for heating the sour gas after its passage through the first scrubbing tower and prior to its passage through the first reaction stage of the second converter 10; a second heat exchanger 12 for heating or cooling the sour gas between the first and second reaction stages of the second converter 10; a second scrubbing tower 13 for separating the liquid sulphur from the gaseous admixture after its passage through the second converter; a pump 14 for pumping liquid sulphur to the top of the second scrubbing tower; a heater 15 for heating the regenerating medium, preferably air; a fan or blower 16 for supplying air under pressure to the heater 15; a sulphur burner 17, in which a mixture of liquid sulphur and air is burned to produce a gas of combustion having as high an $SO_2$ content as possible, preferably 19–20%; and a waste heat boiler 18 which utilizes the heat of the gases of combustion in the sulphur burner to generate steam for running auxiliary machinery and other purposes. The sulphur burner 17 and the waste heat boiler 18 may be of any suitable, usual type. The burner 17 is shown as having a liquid sulphur supply pipe 19 connected to supply liquid sulphur from the first scrubbing tower; and an air supply pipe connected to the hot air blower 16 for supplying air under pressure to the burner.

The two converters or reactors 5 and 10 are identical in construction and are generally similar to the fluid treating apparatus shown in co-pending application, Ser. No. 315,309, filed October 17, 1952, for Fluid Treating Apparatus, by Dan Ringo and Ernest B. Miller. The details of the converters are shown in Figs. 1 to 17, inclusive. As there shown, each of the converters comprises an upright cylindrical pressure vessel 20; an upper cylindrical distribution chamber 21 secured to the top of the vessel 20; a lower cylindrical distribution chamber 22 secured to the bottom end of the vessel 20, suitable framework, indicated generally at 23, for supporting the vessel 20 and the distribution chambers in a raised position; a rotatable vertical shaft 24 extending through the pressure vessel 20 and journaled and supported by suitable radial bearings mounted in the closure discs of the upper and lower distribution chambers, with its lower end extending through a suitable shaft seal secured to the bottom of the closure disc of the lower distribution chamber, a vertical shaft 25 coupled to the bottom end of the shaft 24 and connected to suitable differential gearing, indicated at 26, driven by a motor 27; a double-faced rotatable disc valve 28 mounted within each of the distribution chambers 21, 22 and fixedly secured on the shaft 24 for rotation therewith; a plurality of fluid inlet conduits, three being shown, 29, 30, 31, connected to the top of the upper distribution chamber 21 for admitting fluids thereto; a plurality of fluid outlet conduits, three being shown, 32, 33, 34, connected to the bottom of the lower distribution chamber 22 for exhausting fluids therefrom; and a plurality of fluid treating cylindrical pressure vessels 35 supported in a raised upright position encircling the vessel 20, by a suitable framework, indicated generally at 36, with each of the vessels having an inlet pipe 37 connecting its upper end portion to the bottom of the upper distribution chamber 21 and an outlet pipe 38 connecting its lower end portion to the top of the lower distribution chamber 22.

Figure 4:
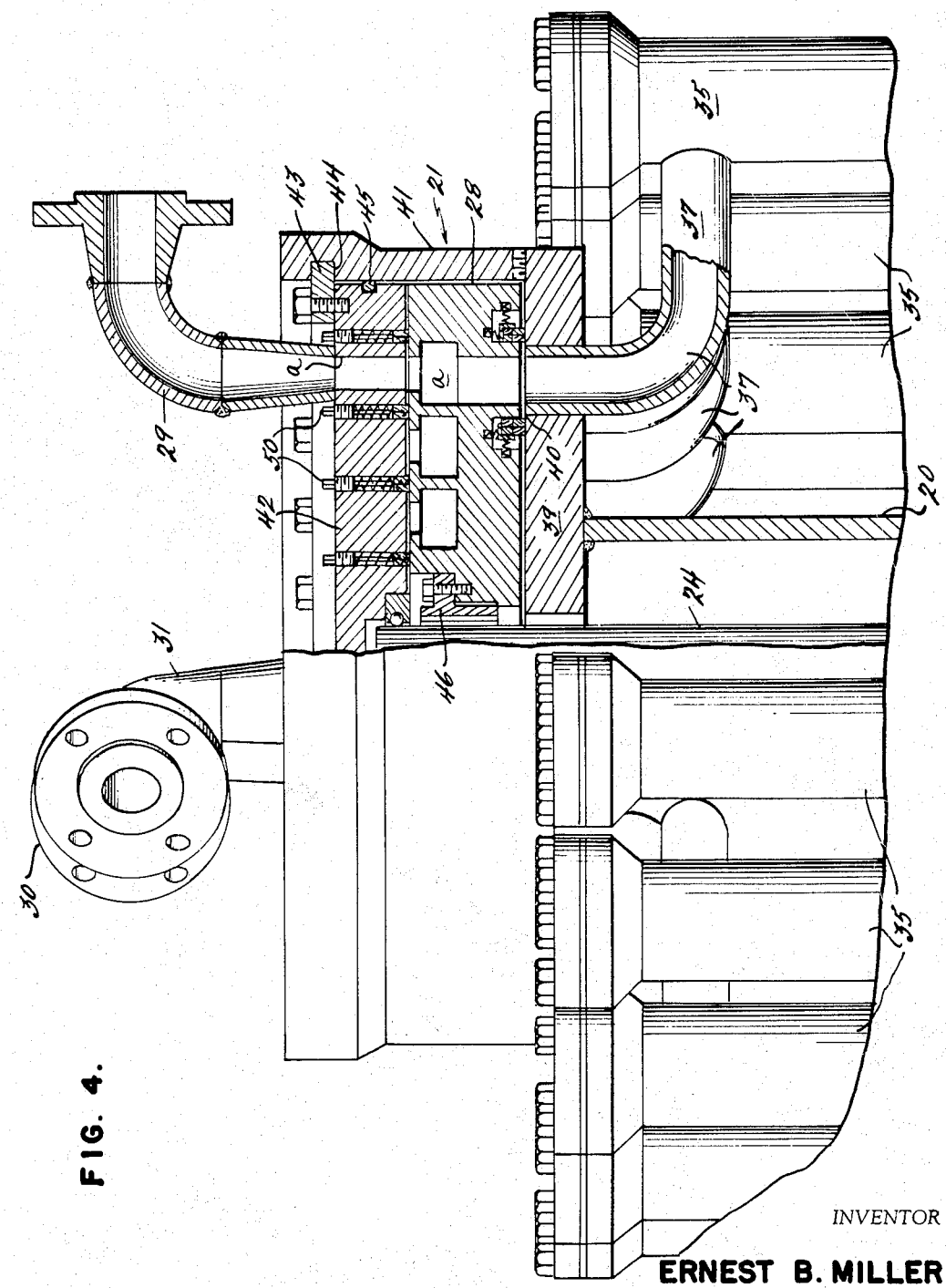
Fig. 4 is a fragmentary elevational view, partly in vertical cross section and with parts broken away, showing the upper end of the apparatus shown in Fig. 1.
Figure 5:
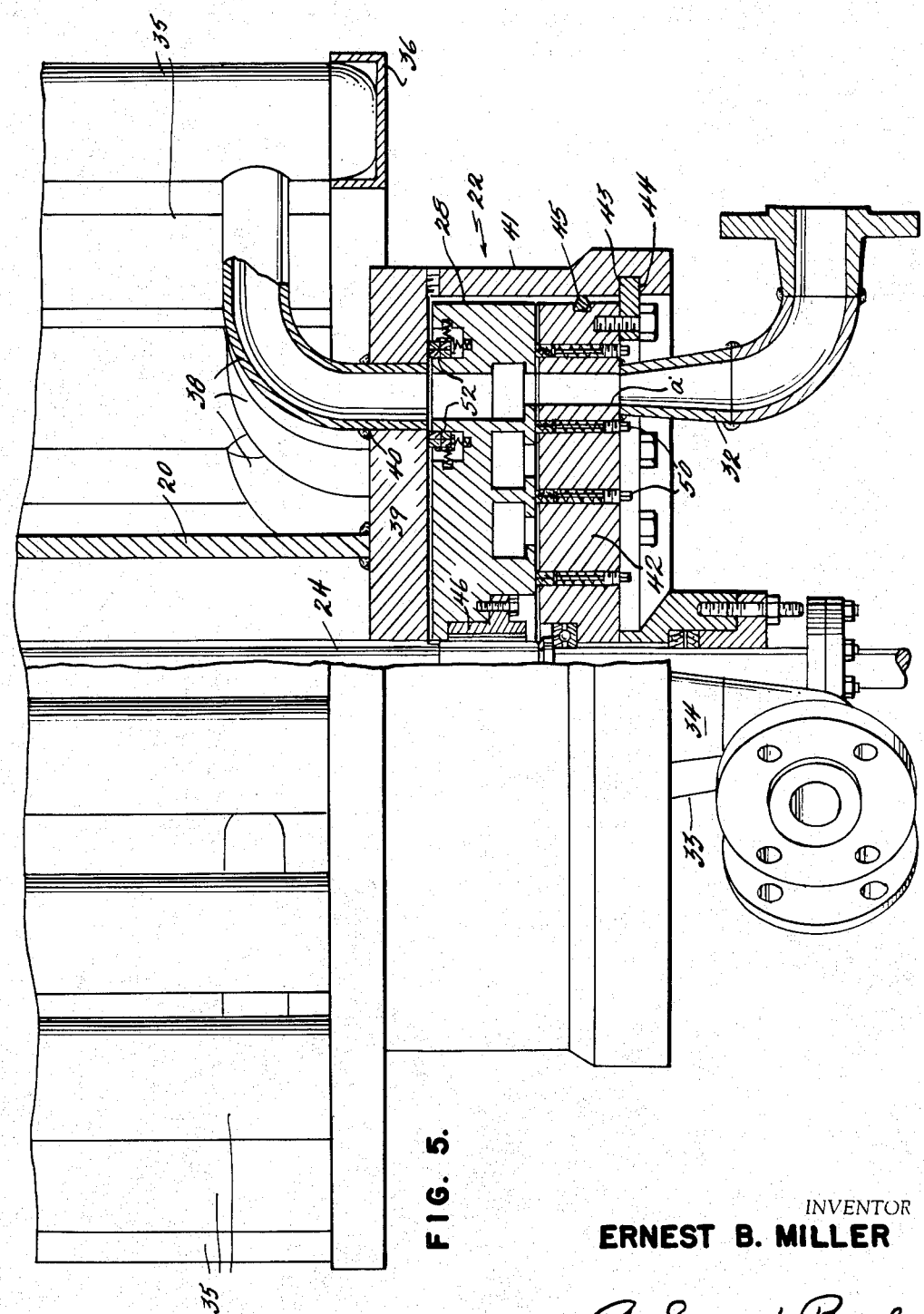
Fig. 5 is a view similar to that shown in Fig. 4, but showing the bottom end of the apparatus shown in Fig. 1.
Figure 8:
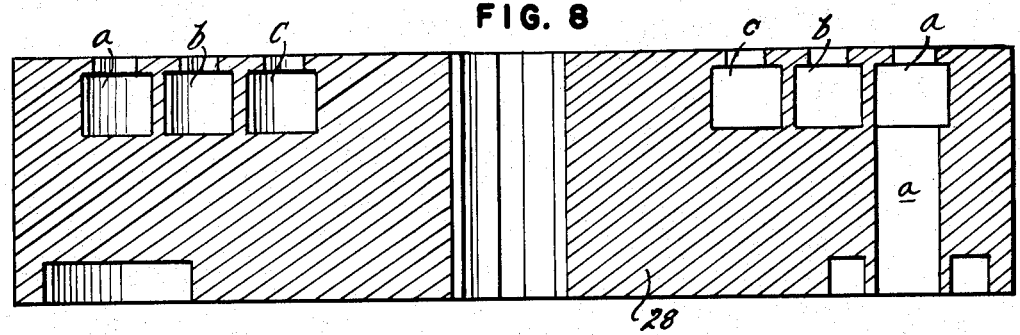
Fig. 8 is a vertical cross sectional view taken on the line 8—8 of Fig. 6.
Figure 9:
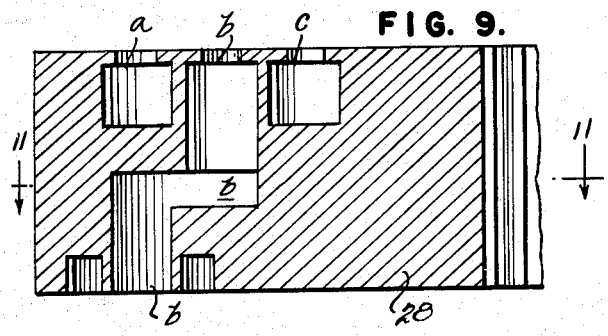
Fig. 9 is a vertical cross sectional view, taken on the line 9—9 of Fig. 6.
Figure 10:
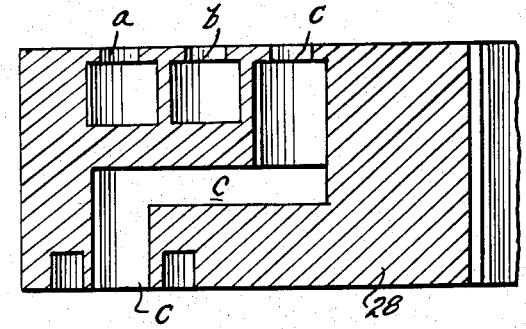
Fig. 10 is a vertical cross sectional view, taken on the line 10—10 of Fig. 6.
Figure 11:
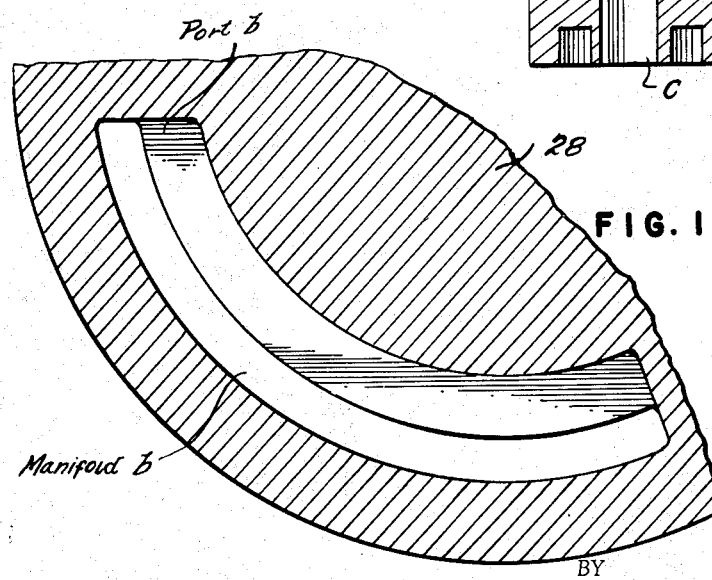
Fig. 11 is a horizontal cross sectional view, taken on the line 11—11 of Fig. 9.

The upper and lower distribution chambers are identical in construction and, as shown in Figs. 4 and 5, each comprises an inner tube sheet disc 39 secured to an end of the cylindrical vessel 20, as by welding, and having a plurality of circular openings 40 extending therethrough, the openings being spaced from each other and formed in a circular row spaced inwardly from the periphery of the discs; a cylindrical collar 41 which forms the side wall of the chamber and which may be formed integral with the disc 39, as shown, or welded thereto; a closure disc 42 provided with three circumferentially and radially spaced inlet openings, which, for the purpose of clarity of description, are designated $a$, $b$ and $c$, respectively, secured in the outer end of the chamber, as by means of a split shear ring 43 bolted thereto and fitted into a circumferential recess 44 formed in the inner surface of the collar; and an O-ring packing 45 mounted between the closure disc 42 and the collar 41 to insure the gas-tightness of the chamber.

The three inlet conduits 29, 30, 31, are secured to the closure disc 42 of the upper distribution chamber 21, as by welding, for communication with the interior of the chamber through openings $a$, $b$ and $c$, respectively. The three outlet conduits 32, 33, 34 are secured to the closure disc 42 of the lower distribution chamber 22, as by welding, for communication with the interior of the chamber through openings $a$, $b$ and $c$, respectively. The upper ends of the inlet pipes 37 which connect the pressure vessels 35 to the upper distribution chamber 21, are fitted into the openings 40 formed in the tube sheet disc 39 of the upper distribution chamber. The lower ends of the outlet pipes 38 which connect the pressure vessels 35 to the lower distribution chamber 22, are fitted into the openings 40 formed in the tube sheet disc 39 of the lower distribution chamber.

The double-faced disc valves 28 are identical in construction and each is mounted within its respective distribution chamber between the tube sheet disc 39 and the closure disc 42 and is fixedly connected to the shaft 24 for rotation therewith, as by means of a splined collar 46 mounted on the shaft and bolted to the disc valve.

The details of construction of the double-faced disc valve 28 are best shown in Figs. 6 to 11, inclusive. As there shown, the upper face of the disc valve has a plurality of radially spaced concentric channels formed therein, three such channels being shown, and, for the purpose of clarity of description, designated fluid annulus $a$, $b$ and $c$, respectively (see Figs. 6 and 8). In the particular embodiment illustrated, the outer channel $a$ and inner channel $c$ are separated from the intermediate channel $b$ by walls which are T-shaped in cross section. The bottom face of the disc valve 28 has a plurality of circumferentially spaced arc-shaped channels formed therein, three such channels being shown, and, for the purpose of clarity, designated manifolds $a$, $b$ and $c$, respectively (see Figs. 7 and 8). The channels $a$, $b$ and $c$ are of the same length and have equal radii.

A plurality of generally trapezoidal shaped circumferentially spaced passageways are formed in the disc valve, three such passageways being shown, and, for the purpose of clarity of description, designated ports $a$, $b$ and $c$, respectively. The port $a$ provides communication between a portion of the bottom of the annulus $a$ formed in the upper face of the valve disc and the manifold $a$ formed in the bottom face of the disc valve (see Fig. 8); the port $b$ provides communication between a portion of the bottom of the annulus $b$ and the manifold $b$ (see Figs. 9 and 11); and the port $c$ provides communication between the annulus $c$ and the manifold $b$ (see Fig. 10).

The disc valves 28 are mounted within their respective distribution chambers with their surfaces containing the manifolds $a$, $b$ and $c$ slightly spaced from the tube sheet discs 39 and with each of the manifolds in vertical alignment with a group of the circular openings 40 in the tube sheet discs and with their surfaces containing the annular channels $a$, $b$ and $c$ slightly spaced from the closure disc 42 and with the annular channels in vertical alignment with the inlet openings a, b and c, respectively, formed in the closure discs 42.

The manner in which the annular channels a, b and c and the manifolds a, b and c are sealed off from the space within the distribution chambers is best shown in Figs. 4, 5, 12, 13 and 14. As there shown, the open tops of the annular channels a, b and c in the disc valve 28 are sealed off from the space between the closure discs 42 and the surface of the valve disc by means of annular seals 47, each seated in an annular recess formed in the inner surface of the closure disc with their lower ends pressed into engagement with the surface of the valve disc by means of split, flat, annular metal strips 48 resting on the upper ends of the seals and pressed downwardly thereon, as by means of a plurality of coiled springs 49 mounted in circumferentially spaced vertical openings extending through the closure disc with an adjusting and pressure sealing plug 50 threaded in each opening for adjusting the pressure of the spring. Each of the adjusting plugs may be provided with a depending stem 51 extending downwardly through the spring to hold it in upright position. Each of the seals 47, preferably, and as shown, comprises a plurality of annular strips of packing generally rectangular in cross section and made of any suitable material, such as teflon or silica impregnated asbestos.

The open bottoms of the three manifolds a, b and c formed in the disc valve 28 are sealed off from the space between the inner surface of the disc 39 and the disc valve by means of annular seals 52, each seated in an annular recess formed in the inner surface of the disc valve with their lower ends pressed into sealing engagement with the surface of the disc 39.

Figure 12:
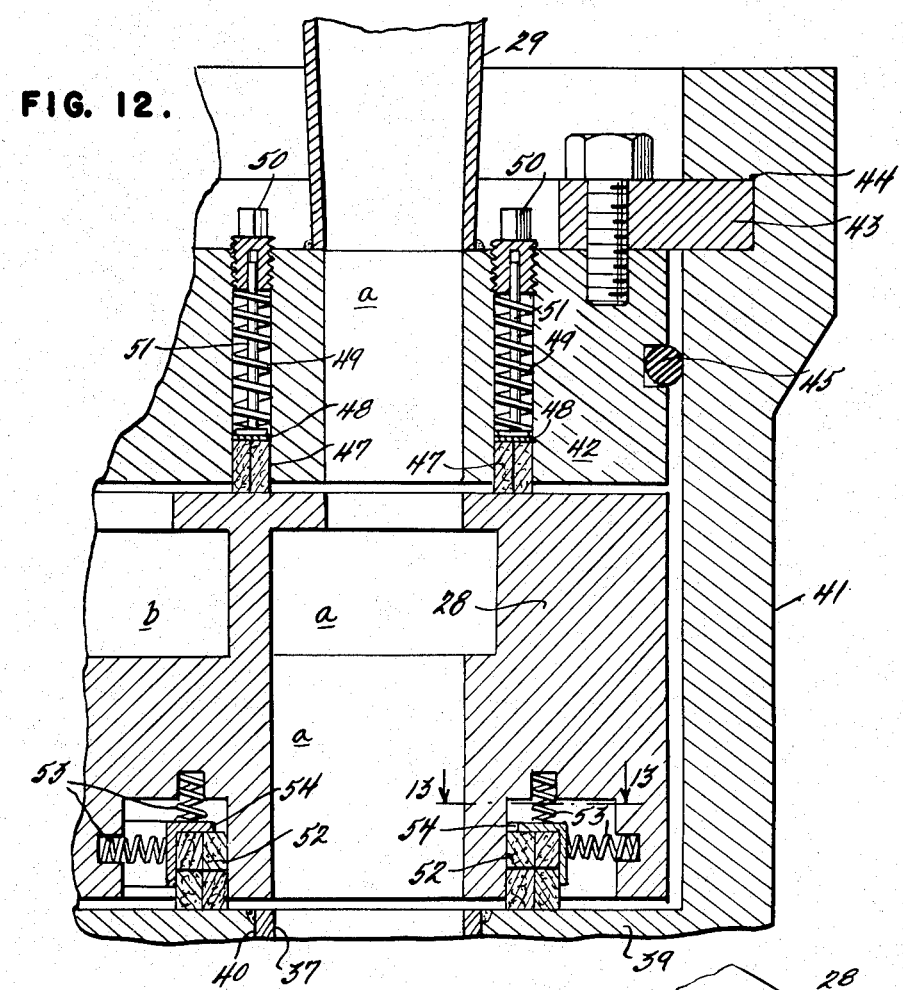
Fig. 12 is a fragmentary detail view showing the manner in which the packing rings between the rotatable disc valve and the stationary end wall members of the distribution chambers are mounted.
Figure 13:
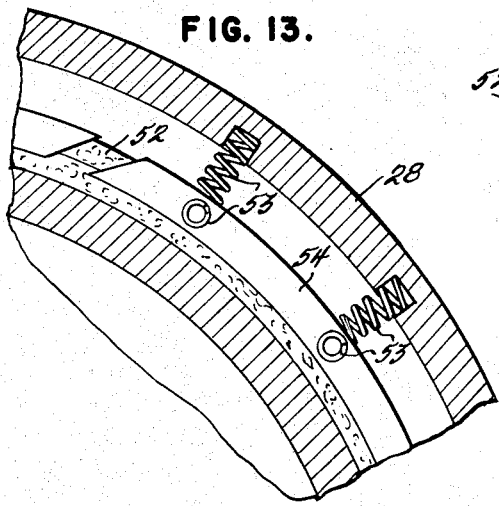
Fig. 13 is a horizontal cross sectional view, taken on the line 13—13 of Fig. 12.
Figure 14:
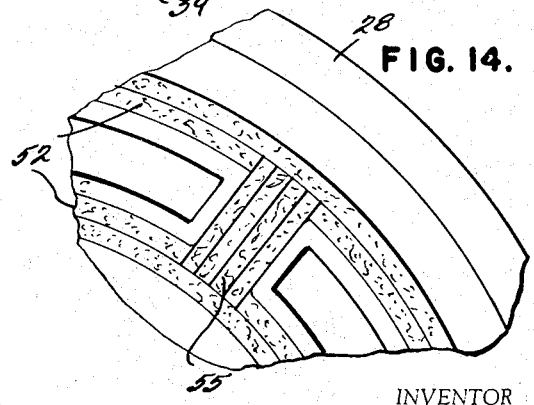
Fig. 14 is a fragmentary detail view showing the manner in which the packing is mounted in a cross seal.

Each of the annular seals 52 is pressed into engagement with the inner surface of the disc 39 and the side walls of the recess in which the seal is mounted, adjacent the manifold, as by means of a plurality of circumferentially spaced coiled springs 53 fitted into circular recesses formed in the top and a side wall of the recess and engaging the top and side legs of a split annular retaining ring 54, made of angle iron (see Figs. 12 and 13).

Each of the seals 52, preferably, and as shown, comprises a plurality of annular strips of packing, generally rectangular in cross section and made of any suitable material such as teflon or silica impregnated asbestos.

Obviously, any leakage of fluids past the seals 47 and 52 into the distribution chamber and the pressure vessel 20 serves to equalize the pressure on both sides of the seals and increases their sealing efficiency. The O-ring packings 45 and the shaft seal serve to prevent leakage from the distribution chambers and the pressure vessel 20.

The three manifolds a, b and c are sealed off from each other by means of cross seals 55, each seated in a radially extending recess formed in the surface of the disc valve between the adjacent end walls of the manifolds a, b and c and opening into the adjacent annular recess in which the annular seals 52 are seated. Each cross seal is tightly wedged in its recess with its ends in sealing engagement with the adjacent side walls of the annular seals 52 and with its bottom surface pressed into tight sealing engagement with the inner surface of the disc 39 (see Fig. 14).

The widths of the manifolds a, b and c are substantially the same as the internal diameters of the circular openings 40 in the tube sheet discs 39 and each of the cross seals 55 is of a width greater than the diameters of the circular openings 40, so that each cross seal can effectively seal off one of the openings 40.

Each of the openings 40 formed in the tube sheet disc 39 of the lower distribution chamber 22 is in vertical alignment with a corresponding one of the openings 40 formed in the tube sheet disc 39 of the upper distribution chamber 21 and each of the three cross seals 55 which separate the manifolds a, b and c formed in the lower valve disc 28 is in vertical alignment with a corresponding one of the cross seals 55 which separate the manifolds a, b and c formed in the upper valve disc 28.

When the rotary disc valves 28 are stationary, the foregoing arrangement, in effect, divides the pressure vessels 35 into three groups, with one group connected to communicate with the manifolds a, one group connected to communicate with the manifolds b, and one group connected to communicate with the manifolds c, so that three separate, distinct and continuous flows of fluid may pass through the apparatus. Each flow entering the upper distribution chamber 21 by means of one of the inlet conduits 29, 30 or 31, thence through one of the groups of pressure vessels 35 into the lower distribution chamber 22 and out through one of the outlet conduits 32, 33, or 34. As the upper and lower disc valves rotate, each of the flows of fluid will successively pass through each of the pressure vessels 35.

Obviously, the respective pairs of manifolds a—a, b—b and c—c may be of different lengths so that the number of pressure vessels in communication with one pair of manifolds may be different from the number in communication with the other pairs of manifolds, if desired.

The catalyst material containing pressure vessels 35 are identical in construction and, as shown in Fig. 15, each comprises an elongated, hollow, cylindrical member 56 having a closed rounded bottom end and an open upper end provided with an integral flange 57, to which is secured, as by bolting, a removable cover plate 58.

Horizontally disposed and vertically spaced annular discs 59, 60 are mounted in the upper and lower end portions, respectively, of the member 56 and secured therein, as by welding, to form a gas-tight joint between the outer peripheral edges of the discs and the side walls of the member 56. The diameter of the opening in the upper disc valve 59 is greater than the diameter of the opening in the lower disc 60 and a generally frusto-conically shaped, hollow baffle member 61 extends between the discs 59 and 60 with its top end fitted in the opening in the upper disc 59 and its lower end secured to the disc 60, as by welding, along a circle spaced outwardly from the peripheral edge of the opening therein to leave an annular ledge 62 surrounding the opening. The annular ledge 62 forms a support for an elongated annular fluid treating material containers 63. The container 63 is removably mounted within the frusto-conically shaped baffle member 61, with its bottom end resting on the ledge 62 and with its upper end extending through the opening in the upper disc 59.

The inlet pipe 37 is connected, as by welding, to the vessel 35 at a point above the upper annular disc 59 and the outlet pipe 38 is connected, as by welding, to the vessel 35 at a point below the lower annular disc 60, as shown in Fig. 15.

The containers 63 are identical in construction and, as shown in Figs. 16 and 17, each comprises two concentric tubular screens 64, 65 held in spaced-apart relation by a plurality of longitudinal radial fins 66, with the annular space between the screens closed at the bottom, as by a flanged annular plate 67. The mesh of the screens is such as to retain a granular fluid treating material 68 in the annular space between the screens. In the instant case, the catalyst 68 may be any impregnated adsorbent having characteristics substantially like silica gel or the gel of other activated hydrous oxides. Preferably, silica gel is used.

Each of the containers 63 is closed at its top by means of concentric hoops or metal bands 69, 70 mounted on the concentric screens 64, 65, and a cover plate 71 detachably connected to the inner hoop or band 70, as by screws, and having a depending annular flange 72 fitting between the hoops or bands 69, 70. A depending cylindrical fin 73 is secured to the flange 72 and projects downwardly between and below the hoops or bands 69, 70, and fits in slits 74 formed in the upper ends of the radial fins 66, all as shown in Figs. 16 and 17. The construction is such that, as the catalyst settles down, leaving a space between the top portion of the wire screens devoid of catalyst, the fin 73 will prevent fluid from passing through the space.

Mounted within the inner wire screen 65 is an inverted substantially conically-shaped baffle member 75. The baffle member 75 is closed at its apex which extends downwardly to a point near the bottom of the container and has its upper peripheral edge suitably secured to the band 70, as by welding. Preferably, the baffle member 75 is made of thin sheet metal.

When the container 63 is mounted within the hollow member 61, as shown in Fig. 15, the elongated annular space between the walls of the member 61 and the inverted conical baffle member 75 forms an elongated frusto-conical shaped duct which is annular in cross section. The annular container, filled with catalyst, is positioned in the duct between the members 61 and 75 in such manner that it forms a barrier extending longitudinally across the duct from top to bottom. The cross sectional areas of the duct at its top and bottom are substantially equal and the tapers of its side walls are such that a substantially uniform velocity is obtained on both sides of the barrier as fluid is transferred from the upstream to the downstream side, regardless of the direction of flow, thereby creating a substantially constant static head over the face of the barrier, resulting in a substantially uniform distribution of the fluid throughout the entire barrier area. Thus, it will be seen that by using the baffle members 61 and 75, the entire barrier area is made use of with resultant increase in efficiency, capacity, and economy.

The flows of the various fluids through the two converters and the auxiliary apparatus is schematically shown in Fig. 18. As there shown, the sour natural gas from which the sulphur is to be removed is supplied, under suitable pressure, and from a source not shown, by pipe line 76. Recovered liquid sulphur and air are burned in the sulphur burner 17 to supply $SO_2$ for use as the oxidant in the reactivation zones of the converters. From the sulphur burner 17, $SO_2$ passes through pipe line 77 and branch pipe line 78 to pipe line 76, where it is mixed with the sour natural gas in controlled proportions and the mixed gas passes into heater 6, where its temperature is raised to an optimum pre-reaction temperature of from 250° F. to 350° F. From the heater 6, the mixture of sour gas and $SO_2$ passes through pipe line 79 and enters the upper distribution chamber of the converter 5 through inlet pipe 29 and passes through inlet opening $a$ in the closure disc 42 into the annular channel or annulus $a$ formed in the upper surface of the valve disc 28. From the annulus $a$ the gaseous mixture passes through port $a$ into manifold $a$ formed in the bottom surface of the valve disc 28. From manifold $a$ the gaseous mixture passes through openings 40 formed in the tube sheet disc 39 and inlet pipes 37 into the upper end portions of the group of pressure vessels 35 which are at that time in communication with manifold $a$. The gaseous mixture passes down through the vessels 35 and through the catalyst beds therein into the bottoms of the vessels. The baffle members 61 and 75 within the vessels 35 insure a substantially uniform flow and distribution of the gaseous mixture through the catalyst beds. As the gaseous mixture passes through the catalyst, an exothermic reaction takes place in which elemental sulphur is liberated in vapor form, together with steam, in accordance with the following equation:

$$2H_2S + SO_2 = 2H_2O + 3S$$

From the bottoms of the vessels 35, the partially reacted gaseous admixture passes through outlet pipes 38 and openings 40 in the tube sheet disc 39 in the lower distribution chamber into the manifold $a$ formed in the upper surface of valve disc 28 therein. From the manifold $a$ the admixture passes through port $a$ into the channel or annulus $a$ formed in the bottom surface of the valve disc 28 and thence through opening $a$ in the closure disc 42 into the outlet conduit 32. From the outlet conduit 32, the partially reacted gaseous admixture passes through pipe line 80 into the heat exchanger 7.

Additional $SO_2$, in controlled amount, may be admitted to the effluent gaseous mixture prior to its entry into the heat exchanger 7, if desired, by means of pipe line 81, which connects with branch pipe line 78.

The temperature of the gaseous mixture is adjusted in the heat exchanger 7 to an optimum pre-reaction temperature.

From the heat exchanger 7, the gaseous mixture passes through pipe line 82, inlet conduit 30, and inlet opening $b$ in the closure disc 42 of the upper distribution chamber 21, into the annular channel or annulus $b$ in the valve disc 28 therein. From the annulus $b$ the gaseous mixture passes through port $b$ into manifold $b$ in the bottom of the valve disc 28. From the manifold $b$ the gaseous mixture passes through openings 40 formed in the disc 39 and inlet pipe 37 into the upper end portions of the group of pressure vessels 35 which are at that time in communication with the manifold $b$. The gaseous mixture passes downwardly through the pressure vessels 35 of the second group and through the catalyst beds therein into the bottoms of the vessels. As the gaseous mixture passes through the catalyst beds, further reaction takes place, liberating more sulphur vapor and steam.

From the bottoms of the vessels 35 of the second group, the reacted gaseous mixture passes through outlet pipe 38 and openings 40 in the tube sheet disc 39 in the lower distribution chamber into the manifold $b$ formed in the upper surface of valve disc 28 therein. From the manifold $b$ the gaseous mixture passes through port $b$ into the channel or annulus $b$ formed in the bottom surface of the valve disc 28 and thence through opening $b$ in the closure disc 42 into the outlet conduit 33.

From the outlet conduit 33 of converter 5, the effluent gaseous mixture, which consists of unreacted gas, sulphur vapor and steam, passes through pipe line 83 into the bottom end portion of the first scrubbing tower 8.

Molten sulphur is withdrawn from the bottom of the scrubbing tower 8 through pipe line 84 by pump 9 and delivered to the top of the tower through pipe line 85. The molten sulphur cascades downwardly through the scrubbing tower and is brought into intimate contact with the countercurrent stream of gas, steam and elemental sulphur vapor rising through the tower and condenses the sulphur vapor into molten sulphur which collects in the bottom of the tower. Pipe line 19, which supplies liquid sulphur to the sulphur burner 17, is connected to pipe line 85.

Air for use as the regenerating medium is forced into the hot air heater 15 by means of the fan or blower 16. The air is heated to a temperature of about 1000° F. in the heater and, from the heater, passes through pipe line 86, inlet (outlet) conduit 34 and inlet opening $c$ in the closure disc 42 of the lower distribution chamber 22 of converter 5, into the annular channel or annulus $c$ in the lower disc valve 28. From the annulus $c$, the heated air passes through port $c$ into manifold $c$ in the top of the disc valve 28. From manifold $c$ the hot air passes through openings 40 formed in the tube sheet disc 39 and inlet pipe 38 into the lower end portion of the group of pressure vessels 35 which are at that time in communication with the manifold $c$. The heated air passes upwardly through the pressure vessels of the third group and through the catalyst beds therein into the tops of the vessels. As the heated air passes through the catalyst beds, any impurities in the form of tars or carbonaceous matter are burned off and the catalyst material is reactivated. From the tops of the pressure vessels 35 of the third group, the hot air passes through outlet pipes 37 and opening 40 in the tube sheet disc 39 in the upper distribution chamber 21 into manifold $c$ in the lower surface of the upper valve disc 28. From manifold $c$ the hot air passes through port c into the annular channel or annulus c formed in the top surface of the valve disc 28 and thence through opening c in the closure disc 42 into outlet (inlet) conduit 31, where it is exhausted to the atmosphere.

From the top of the first scrubbing tower 8, the partially desulphurized gas passes through pipe line 87 into the second pre-heater 11. The oxidant gas, $SO_2$, passes from the sulphur burner 17 through pipe line 77 to pipe line 87, where it is mixed with the gas being treated in controlled proportions and the gaseous mixture passes into pre-heater 11, where its temperature is adjusted to an optimum pre-reaction temperature.

From the heat exchanger 11, the gaseous mixture passes through pipe line 88 and enters the upper distribution chamber of the converter 10 through inlet conduit 29 and passes through the annulus a, ports a and manifolds a in the upper and lower distribution chambers and the group of pressure vessels 35 which are at that time in communication with the manifolds a. The gaseous mixture moves downwardly through the catalyst beds in the pressure vessels 35, and an exothermic reaction takes place as in the first converter and elemental sulphur is liberated in vapor form together with steam, in accordance with the following equation:

$$2H_2S + SO_2 = 2H_2O + 3S$$

After its first passage through the converter, the gaseous mixture passes from the lower distribution chamber through outlet conduit 32 and pipe line 89 to the heat exchanger 12. Additional $SO_2$, in controlled amount, may be admitted to the effluent gaseous mixture prior to its entry into the heat exchanger 12, if desired, by means of pipe line 90, which connects with $SO_2$ pipe line 77.

The temperature of the gaseous mixture is adjusted in the heat exchanger 12 to an optimum pre-reaction temperature. From the heat exchanger 12, the gaseous mixture passes through pipe line 91 and enters the upper distribution chamber of the converter 10 through inlet conduit 30 and passes through the annuluses b, ports b and manifolds b in the upper and lower distribution chambers and the group of pressure vessels 35 which are at that time in communication with the manifolds b. As the gaseous mixture passes through the catalyst beds in the pressure vessels 35, further reaction takes place, liberating more sulphur vapor and steam.

After its second passage through the converter, the gaseous mixture, which now consists almost solely of sulphur vapor and steam, passes from the lower distribution chamber through outlet conduit 33 and passes through pipe line 92 into the bottom of the scrubbing tower or zone 13.

Molten sulphur is withdrawn from the bottom of the scrubbing tower 13 through pipe line 93 by pump 14 and delivered to the top of the tower through pipe line 94. The molten sulphur cascades downwardly through the scrubbing tower and is brought into intimate contact with the countercurrent stream of sulphur vapor and steam rising through the tower and condenses the sulphur vapor into molten sulphur which collects in the bottom of the tower. The desulphurized gas passes from the scrubbing tower 13 through pipe line 95.

Hot air for use as the regenerating medium is supplied through pipe line 96 which is connected to hot air pipe line 86, and enters the lower distribution chamber of the converter 10 through outlet (inlet) conduit 34 and passes upwardly through the annuluses c, ports c and manifolds c in the lower and upper distribution chambers and the group of pressure vessels 35 which are at that time in communication with the manifolds c.

As the hot air passes through the catalyst beds, any impurities in the form of tars or carbonaceous matter are burned off and the catalyst material is reactivated. The hot gases of regeneration pass from the upper distribution chamber of the converter 10 through outlet (inlet) conduit 31 and are exhausted to the atmosphere.

In each of the converters 5 and 10, the gas being desulphurized by reaction makes two passages through groups of the catalyst containing pressure vessels, while the heated gas or reactivating medium makes a single passage through a group of the catalyst containing pressure vessels. For convenience in description, the pressure vessels which form the group through which the first desulphurization passage is made is called the first reaction stage, the group through which the second desulphurizing passage is made is called the second reaction stage, and the group through which the hot gas used for reactivation passes is called the reactivation stage. Also, the pressure vessels are called zones in which either reaction or reactivation takes place, depending upon the particular fluid flowing therethrough at a given time. As the disc valves 28 are rotated, the flows of the natural gas and the flow of the heated gas through the respective groups of pressure vessels or zones communicating with the manifolds a, b and c in the upper and lower distribution chambers, respectively, are shifted by a simultaneous rotary movement so that the trailing zone, in the direction of rotation, in each group will be transferred to the adjacent following group, whereby each zone will become, in succession, a reaction zone and a reactivation zone.

Figure 1:
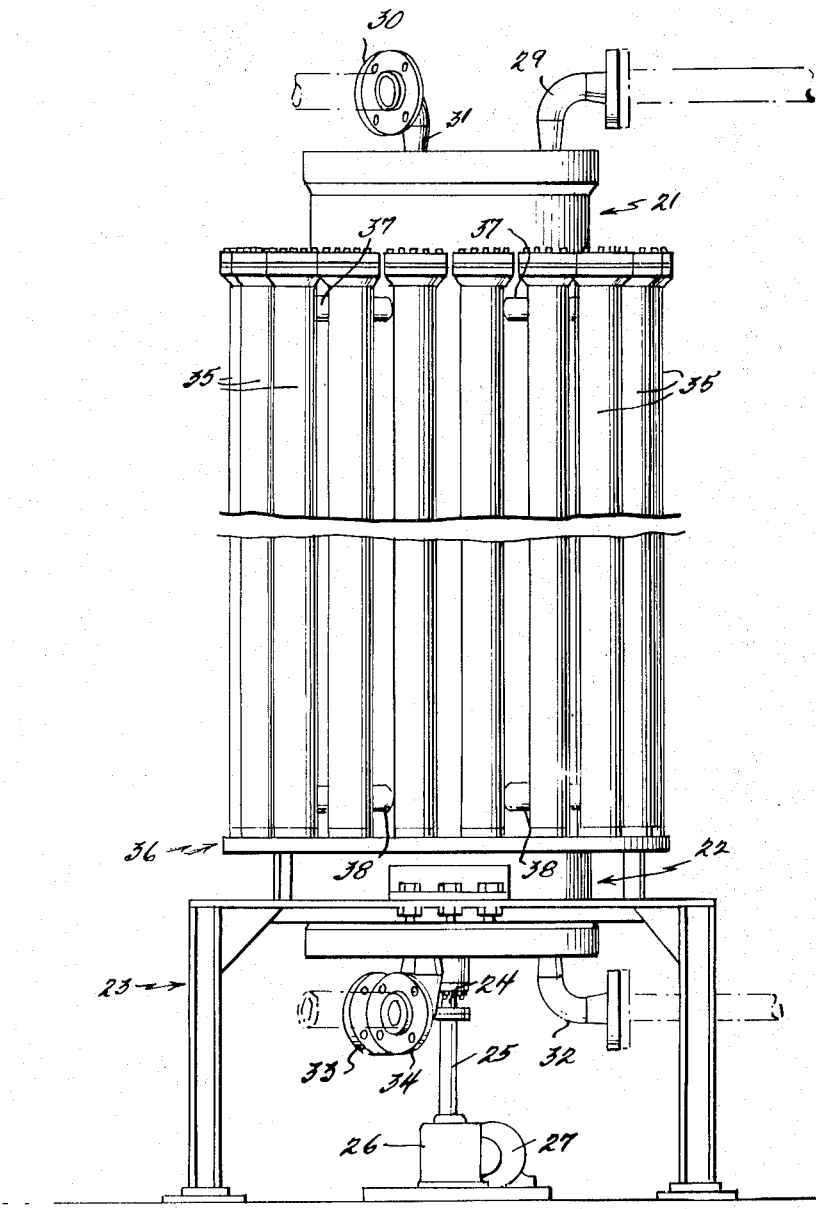
Fig. 1 is a side elevational view of one embodiment of fluid treating apparatus used in carrying out the method of the present invention.
Figure 2:
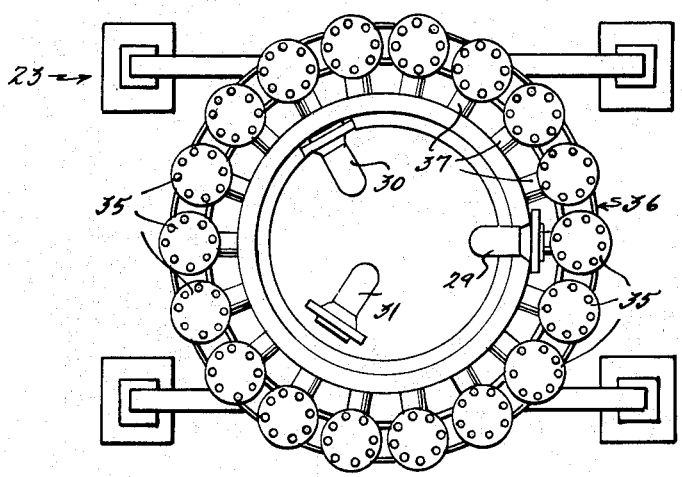
Fig. 2 is a plan view of the apparatus shown in Fig. 1.
Figure 3:
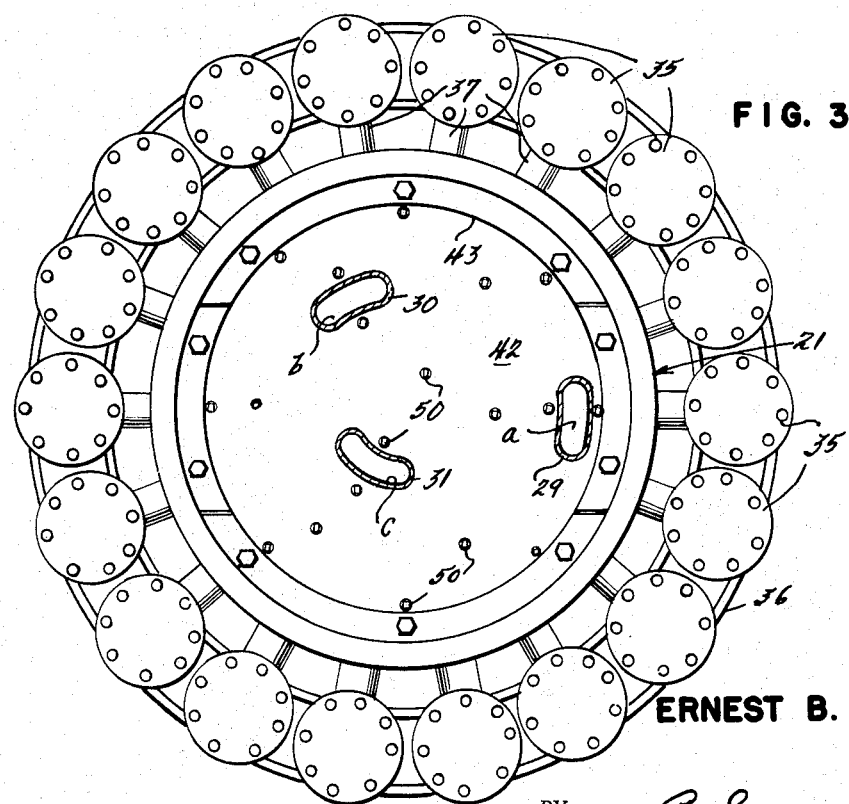
Fig. 3 is a plan view, on a larger scale, of the apparatus shown in Fig. 1, with the inlet conduits broken away.

In the particular embodiment of the invention illustrated, the valve discs 28 are rotated counterclockwise, as viewed in Fig. 2, and at a rate of 1 revolution every 10 minutes; thus, it will be seen that, as the disc valves 28 rotate, each of the pressure vessels 35 will be successively brought into communication with the manifolds a, b and c in the upper and lower distribution chambers, so that each pressure vessel 35 will, in turn, become a second reaction zone, a first reaction zone, and an activation zone.

While the foregoing description of the method is not concerned with the utilization of pressurized equipment, this is not a limitation. Some pressure will be required on the system to overcome the back pressure due to friction. Pressure above this limitation is not necessary to successful operation. On the other hand, by allowance for the differential pressure, a reasonable increase in the over-all operating pressures will permit handling larger gas volumes in an apparatus of fixed size. The particular apparatus shown is designed to handle gases at high pressures; although it is contemplated that the method herein described can be practiced by utilizing pressures of from about 5 lbs. to 10 lbs. per square inch.

The present method is contrived to recover a major portion of the contained sulphur in the sour gas in a multi-stage oxidation process without raising the reaction temperature in any stage above about 830° F., by adjusting the temperature of the admixture of the gas to be treated and the sulphur liberating gas, illustratively $SO_2$, to an optimum pre-reaction temperature in the range of from about 375° F. to about 600° F., prior to the entry of the admixture into each of the reaction stages and controlling the amount of $SO_2$ admitted into each reaction stage. However, it is contemplated that substantial portions of the contained sulphur may be removed in the respective stages when employing pre-reaction temperatures up to about 800° F., while controlling the reaction temperatures in the stages so that they do not exceed about 1000° F. in any stage. It will be understood, however, that at higher reaction temperatures than above 830° F., the efficiency of the conversion will be reduced. Therefore, it is highly preferable to practice the method at relatively low reaction temperatures.

As a specific example, assume that the raw gas to be treated contains 125 lbs. of $H_2S$ per 4300 cubic feet at a pressure of 10 lbs. guage and at 100° F. Then, about 30% of the initial $H_2S$ content of the gas can be converted into sulphur vapor in the first oxidation stage of the first reactor by pre-heating the gas to about 500° F. and mixing $SO_2$ with the pre-heated gas at the rate of about 30 lbs. of $SO_2$ per minute prior to the entry of the gas into the reactor in which the first oxidation stage occurs. The temperature in the reactor will rise to from about 720° F. to about 750° F.

About 30% of the initial $H_2S$ content of the gas can be converted into sulphur vapor in the second oxidation stage of the first reactor by cooling the gaseous admixture delivered from the first oxidation stage to about 500° F., then mixing $SO_2$ with the cooled gaseous mixture at the rate of about 30 lbs. of $SO_2$ per minute prior to its entry into the reactor in which the second oxidation stage occurs. The temperature in the reactor will rise to from about 680° F. to about 710° F.

About 30% of the initial total $H_2S$ content of the gas can be converted into sulphur vapor in the first oxidation stage of the second reactor by pre-heating the gas after it passes through the first scrubbing tower to about 500° F. and mixing $SO_2$ with the pre-heated gas at the rate of about 30 lbs. of $SO_2$ per minute prior to its entry into the first oxidation state of the second reactor. The temperature in the reactor will rise to from about 670° F. to about 700° F. The remaining 10% of the initial total $H_2S$ content of the gas can be converted into sulphur vapor in the second oxidation stage of the second reactor by cooling the gaseous admixture delivered from the first oxidation stage to about 500° F., then mixing $SO_2$ with the cooled gaseous admixture at the rate of about 11 lbs. of $SO_2$ per minute prior to its entry into the second oxidation stage of the second reactor. The temperature in the reactor will rise to from about 530° F. to about 560° F.

Obviously, with a raw gas having a much lesser $H_2S$ content, it will be possible to remove all of the $H_2S$ in the first reactor without raising the temperature in either the first or second oxidation stages above a permissible reaction temperature of from about 747° F. to about 830° F.

It is always advisable, however, to do as much oxidation as possible in the first stage, consistent with the above mentioned reaction temperatures, so that it has been found advisable, when treating a gas containing about 15% $H_2S$, to supply oxidant gases to the various stages so as to accomplish about 55% conversion in the first stage, about 25% in the second stage, about 12% on the third stage, and 8% in the last stage. Since, in the earlier stages, the catalytic conversion can not be completed, the reaction in these stages can be assisted by the presence of an excess of oxidant gas. Thus, to accomplish the illustrative reactions above, it has been found convenient to supply about 75% of the total oxidant gas in the first stage and the remaining 25% in the second stage. The excess not used up in either of these stages is carried with the gas to be treated, and is available as needed in the last two stages.

In connection with the foregoing, it may be pointed out that, as the boiling point of sulphur is 832° F., a pure sulphur vapor would condense to liquid if cooled below that temperature. In the present method, as above described, there is no concentrated sulphur at any point. In fact, the maximum concentration is about 2%, at which concentration the sulphur vapor will remain in vapor form at the pressures and temperatures employed in the process.

While it is not a necessary feature of the invention, it may be pointed out that, if the liberated sulphur content of the treated gas becomes too high between the first and second oxidation stages of either reactor, all or part of it may be removed. This is readily accomplished, for example, by suitable adjustment of the heat exchangers 7 and 12.

While the two two stage converters have been shown, obviously, one converter may be used, if desired, in which case, the treated gas, after passing through the first scrubbing tower 8, would be sent to its further point of use by means of pipe line 96 connected to pipe line 87.

From the foregoing, it readily will be seen that there has been provided a novel method of recovering elemental sulphur in liquid form from gases containing $H_2S$, which provides for carrying out the reaction process in at least two oxidation stages with control of the temperature rise in each stage, thereby permitting the reaction process to be effected at temperatures below about 800° F., with resulting increase in efficiency of the process, use of less expensive equipment, and permitting the use of a catalyst carrier such as silica gel.

While the invention has been described in connection with the desulphurization of sour gas, obviously, it is also applicable to the desulphurization of other types of sulphur-containing gases and vapors which are subject to the action of a suitable catalyst.

Obviously, the invention is not restricted to the particular embodiment thereof herein shown and described. Moreover, it is not indispensable that all of the features of the invention be used conjointly, since they may be employed advantageously in various combinations and sub-combinations.

What is claimed is:

1. In the recovery of elemental sulphur in liquid form from gases containing $H_2S$ involving the contact of a catalyst with the gas containing $H_2S$ and an oxidant to form sulphur vapor and the subsequent condensation of the sulphur vapor to form liquid sulphur, the improvement which comprises maintaining at least one bed of catalyst in each of a plurality of zones forming a first group of zones and in each of a plurality of zones forming a second group of zones; mixing a predetermined amount of the gas to be treated with a predetermined proportion of sulphur-liberating gas and continuously directing a flow of the gaseous mixture at an optimum pre-reaction temperature through all of the zones forming the first group of zones, so that reaction will take place therein and the $H_2S$ contained in the gaseous mixture will be converted into sulphur vapor and steam; continuously directing the flow of a hot oxidizing medium through all of the zones forming the second group of zones to reactivate the catalyst therein; redirecting the flow of the gaseous mixture and the flow of the oxidizing medium through said groups of zones by shifting the flow passages by a simultaneous rotary movement of the gas paths so that the trailing zone, in the direction of rotation, in each group of zones will be transferred to the other group of zones, whereby each zone will become in succession a reaction zone and a reactivation zone; continuously withdrawing the reacted gaseous mixture from the zones in which reaction is taking place and directing its flow through a condensing zone; and there condensing the sulphur vapor to form liquid sulphur.

2. In the recovery of elemental sulphur in liquid form from gases containing $H_2S$ involving the contact of a catalyst with the gas containing $H_2S$ and an oxidant to form sulphur vapor and steam and the subsequent condensation of the sulphur vapor to form liquid sulphur, the improvement which comprises maintaining at least one bed of catalyst in each zone of a plurality of groups of zones, continuously directing the flow of a hot oxidizing medium through all of the zones of one group of said groups of zones to reactivate the catalyst therein; continuously directing the flow of the $H_2S$ containing gas in succession and in series through the remaining groups of said groups of zones; subjecting the $H_2S$ containing gas to heat exchange to bring its temperature to an optimum reaction temperature and mixing a predetermined amount of oxidant gas with it prior to its passage through each group of zones to convert a portion of the $H_2S$ in each zone in the groups into sulphur vapor and steam; redirecting the flows of the mixture of $H_2S$ containing gas and oxidant gas and the flow of the oxidizing medium through said groups of zones by shifting the flow passages by a simultaneous rotary movement of the gas paths so that the trailing zone, in the direction of rotation, in each group of zones will be transferred to the adjacent following group of said zones, whereby each zone will become in succession a reaction zone and a reactivation zone; continuously withdrawing the reacted gaseous mixture from the zones in the last group of zones through which the gas being treated is flowing and directing its flow through a condensing zone; and there condensing the sulphur vapor to form liquid sulphur.

3. In the recovery of elemental sulphur in liquid form from gases containing $H_2S$ involving the contact of a catalyst with the gas containing $H_2S$ and an oxidant to form sulphur vapor and steam and the subsequent condensation of the sulphur vapor to form liquid sulphur, the improvement which comprises maintaining at least one bed of catalyst in each zone of a plurality of groups of zones; continuously directing the flow of a hot oxidizing medium through all of the zones of one group of said groups of zones to reactivate the catalyst therein; continuously directing the flow of the $H_2S$ containing gas in succession and in series through the remaining groups of said groups of zones; subjecting the $H_2S$ containing gas to heat exchange to bring its temperature to an optimum reaction temperature and mixing a predetermined amount of oxidant gas with it prior to its passage through each group of zones to convert a portion of the $H_2S$ in each zone in the groups into sulphur vapor and steam; redirecting the flow of the mixture of $H_2S$ containing gas and oxidant gas and the flow of the oxidizing medium through said groups of zones by shifting the flow passages by a simultaneous rotary movement of the gas paths so that the trailing zone, in the direction of rotation, in each group of zones will be transferred to the adjacent following group of said zones whereby each zone will become in succession a reactivation zone, and, in reverse order to the flow of the $H_2S$ containing gas therethrough, each a successive reaction zone, whereby the $H_2S$ containing gas will make its last passage through freshly reactivated catalyst; continuously withdrawing the reacted gaseous mixture from the zones in the last group of zones through which the $H_2S$ containing gas is flowing and directing its flow through a condensing zone and there condensing the sulphur vapor to form liquid sulphur.

4. The method as set forth in claim 1, including maintaining at least one bed of catalyst in each of a plurality of zones forming a third group of zones and in each of a plurality of zones forming a fourth group of zones; continuously withdrawing the treated gas from said condensing zone and mixing a predetermined amount of the withdrawn gas with a predetermined proportion of sulphur-liberating gas and continuously directing a flow of the gaseous mixture at an optimum pre-reaction temperature through all of the zones forming the third group of zones, so that reaction will take place therein and the $H_2S$ contained in the gaseous mixture will be converted into sulphur vapor and steam; continuously directing the flow of a hot oxidizing medium through all of the zones forming the fourth group of zones to reactivate the catalyst therein; redirecting the flow of the gaseous mixture and the flow of the oxidizing medium through said third and fourth groups of zones by shifting the flow passages by a simultaneous rotary movement of the gas paths so that the trailing zone, in the direction of rotation, in each group of zones will be transferred to the other group of zones, whereby each zone will become in succession a reaction zone and a reactivation zone; continuously withdrawing the reacted gaseous mixture from the zones in which reaction is taking place and directing its flow through a second condensing zone; and there condensing the sulphur vapor to form liquid sulphur.

5. The method as set forth in claim 1, including the step of burning a mixture of sulphur and air to make $SO_2$ and supplying the $SO_2$ for use as the sulphur liberating gas.

6. The method as set forth in claim 5, in which the sulphur is obtained by recycling a portion of the recovered liquid sulphur.

7. In the recovery of elemental sulphur in liquid form from gases containing $H_2S$ involving the contact of a catalyst with the gas containing $H_2S$ and an oxidant to form sulphur vapor and steam and the subsequent condensation of the sulphur vapor to form liquid sulphur, the improvement which comprises maintaining at least one bed of catalyst in each zone of a plurality of groups of zones; continuously directing the flow of a hot oxidizing medium through all of the zones of one group of said group of zones to reactivate the catalyst therein; continuously directing the flow of the $H_2S$ containing gas in succession and in series through the remaining groups of said groups of zones; subjecting the $H_2S$ containing gas to heat exchange to bring its temperature to an optimum pre-reaction temperature and mixing a sufficient amount of oxidant gas with it prior to its passage through each group of zones to convert a portion of the $H_2S$ in each zone in the groups into sulphur vapor and steam without raising the temperature of reaction in any one of the zones above about 800° F.; redirecting the flow of the mixture of $H_2S$ containing gas and oxidant gas and the flow of the oxidizing medium through said groups of zones by shifting the flow passages by a simultaneous rotary movement of the gas paths so that the trailing zone, in the direction of rotation, in each group of zones will be transferred to the adjacent following group of said zones whereby each zone will become in succession a reactivation zone, and, in reverse order to the flow of the $H_2S$ containing gas therethrough, each a successive reaction zone, whereby the $H_2S$ containing gas will make its last passage through freshly reactivated catalyst; continuously withdrawing the reacted gaseous mixture from the zones in the last group of zones through which the $H_2S$ containing gas is flowing and directing its flow through a condensing zone and there condensing the sulphur vapor to form liquid sulphur.

8. In the recovery of elemental sulphur in liquid form from gases containing $H_2S$ involving the contact of a catalyst with the gas containing $H_2S$ and an oxidant to form sulphur vapor and the subsequent condensation of the sulphur vapor to form liquid sulphur, the improvement which comprises maintaining at least one bed of catalyst in each of a plurality of zones; mixing a predetermined amount of the gas to be treated with a predetermined proportion of sulphur-liberating gas and continuously directing a flow of the gaseous mixture at an optimum pre-reaction temperature through some of said zones so that reaction will take place therein and the $H_2S$ contained in the gaseous mixture will be converted into sulphur vapor and steam; continuously directing the flow of a hot oxidizing medium through the remainder of said zones to reactivate the catalyst therein; redirecting the flow of the gaseous mixture and the flow of the oxidizing medium through the zones by shifting the flow passages by a simultaneous rotary movement of the gas paths so that each zone will become in succession a reaction zone and a reactivation zone; continuously withdrawing the reacted gaseous mixture from the zones in which reaction is taking place and directing its flow through a condensing zone; and there condensing the sulphur vapor to form liquid sulphur.

9. In the recovery of elemental sulphur in liquid form from gases containing $H_2S$ involving the contact of a catalyst with the gas containing $H_2S$ and an oxidant to form sulphur vapor and steam and the subsequent condensation of the sulphur vapor to form liquid sulphur, the improvement which comprises maintaining at least one bed of catalyst in each of a plurality of zones; continuously directing the flow of the $H_2S$ containing gas so that it will make a first passage through at least one of said zones and then a second passage through at least an additional one of said zones; subjecting the $H_2S$ containing gas to heat exchange to bring its temperature to an optimum reaction temperature and mixing a predetermined amount of oxidant gas with it prior to its first passage and prior to its second passage through the zones to convert a portion of the H₂S as it passes through the catalyst beds in the zones into sulphur vapor and steam; continuously directing the flow of a hot oxidizing medium through all of the remainder of said zones to reactivate the catalyst therein; redirecting the flows of the mixture of H₂S containing gas and oxidant gas and the flow of the oxidizing medium through said zones by shifting the flow passages by a simultaneous rotary movement of the gas paths so that each zone will become in succession a reaction zone and a reactivation zone; continuously withdrawing the reacted gaseous mixture from the zones through which the gas being treated is making its second passage and directing its flow through a condensing zone; and there condensing the sulphur vapor to form liquid sulphur.

References Cited in the file of this patent

UNITED STATES PATENTS

| | | |
|---|---|---|
| 2,298,641 | Schulze et al. | Oct. 13, 1942 |
| 2,355,024 | Yerrick et al. | Aug. 1, 1944 |